US010295318B2

(12) United States Patent
Hammond et al.

(10) Patent No.: US 10,295,318 B2
(45) Date of Patent: May 21, 2019

(54) FIN RETENTION AND RELEASE MECHANISM

(71) Applicant: Moog Inc., East Aurora, NY (US)

(72) Inventors: Laurie Hammond, Depew, NY (US); Jonathon Pickard, Cheektowaga, NY (US)

(73) Assignee: Moog Inc., East Aurora, NY (US)

( * ) Notice: Subject to any disclaimer, the term of this patent is extended or adjusted under 35 U.S.C. 154(b) by 228 days.

(21) Appl. No.: 15/123,330

(22) PCT Filed: Mar. 12, 2015

(86) PCT No.: PCT/US2015/020111
§ 371 (c)(1),
(2) Date: Sep. 2, 2016

(87) PCT Pub. No.: WO2015/138687
PCT Pub. Date: Sep. 17, 2015

(65) Prior Publication Data
US 2017/0067725 A1    Mar. 9, 2017

Related U.S. Application Data

(60) Provisional application No. 61/952,732, filed on Mar. 13, 2014.

(51) Int. Cl.
*F42B 10/14* (2006.01)
*F42B 10/20* (2006.01)
(Continued)

(52) U.S. Cl.
CPC ............. *F42B 10/14* (2013.01); *B64C 5/12* (2013.01); *F42B 10/16* (2013.01); *F42B 10/18* (2013.01); *F42B 10/20* (2013.01)

(58) Field of Classification Search
CPC .. B64C 5/12; F42B 10/12; F42B 10/14; F42B 10/16; F42B 10/18; F42B 10/20
See application file for complete search history.

(56) References Cited

U.S. PATENT DOCUMENTS 2,959,143 A * 11/1960 Endrezze ................ F42B 10/14
114/20.1
4,664,339 A * 5/1987 Crossfield ............... F42B 10/14
244/3.28
(Continued)

OTHER PUBLICATIONS

International Search Report and Written Opinion of the International Searching Authority in corresponding International Application No. PCT/US2015/020111; completed May 12, 2015 (10 pages).

*Primary Examiner* — Timothy D Collins
*Assistant Examiner* — Tye William Abell
(74) *Attorney, Agent, or Firm* — Harter Secrest & Emery LLP

(57) ABSTRACT

An improved fin retention and release mechanism (15) comprising an elongated body (16), at least one fin (18a) mounted to the body and capable of moving from a stowed position (30) to a deployed position (32), an actuator (20a) connected to the fin and arranged to rotate the fin about a first axis (33), a fin retention member (19a) connected to the body and configured and arranged to rotate about a second axis (34) from a locked position (36) to a release position (38), the fin and the fin retention member configured and arranged such that the fin is held in the stowed position by the fin retention member when being in the locked position and the fin is not held in the stowed position by the fin retention member when being in the release position, and wherein actuation of the fin about the first axis by the actuator rotates the fin about the first axis in a first direction (39) and correspondingly rotates the fin retention member about the second axis in a second direction (40) opposite to (Continued)

the first direction and from the locked position to the release position.

11 Claims, 12 Drawing Sheets

(51) Int. Cl.
*F42B 10/18* (2006.01)
*B64C 5/12* (2006.01)
*F42B 10/16* (2006.01)

(56) References Cited

U.S. PATENT DOCUMENTS

| | | | |
|---|---|---|---|
| 4,709,877 A | 12/1987 | Goulding | |
| 6,073,880 A * | 6/2000 | Voigt | F42B 10/14 244/3.24 |
| 6,186,443 B1 * | 2/2001 | Shaffer | B64C 5/12 244/3.29 |
| 6,726,147 B1 * | 4/2004 | Perini | F42B 10/14 244/3.27 |
| 6,880,780 B1 | 4/2005 | Perry et al. | |
| 7,475,846 B2 | 1/2009 | Schroeder | |
| 7,732,741 B1 * | 6/2010 | Whitham | F42B 10/64 244/3.27 |
| 8,624,172 B2 | 1/2014 | Sweer | |
| 2005/0151000 A1 * | 7/2005 | Dodu | F42B 10/14 244/3.24 |
| 2009/0101752 A1 | 4/2009 | Mock et al. | |

* cited by examiner

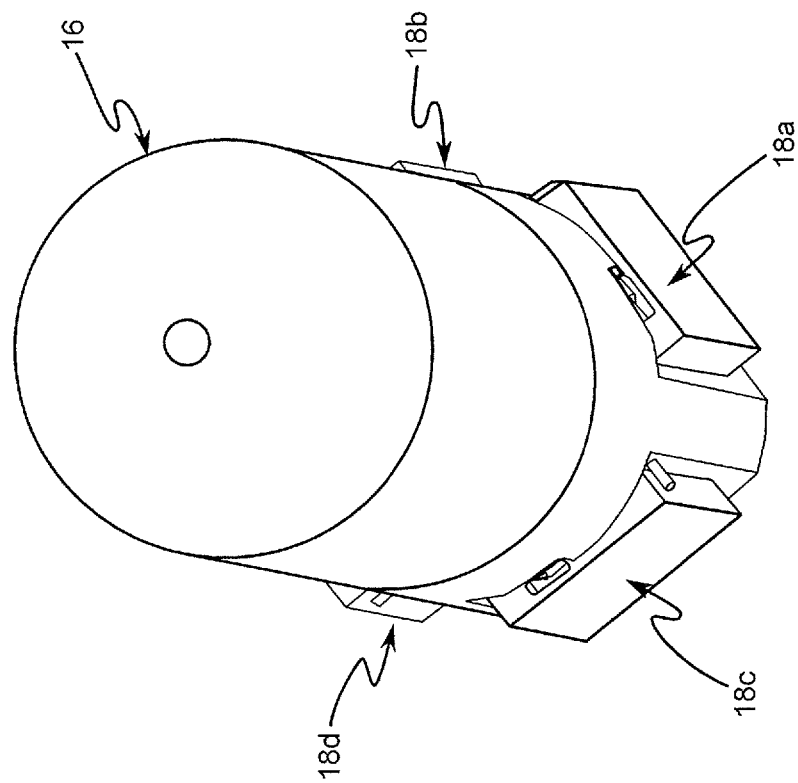
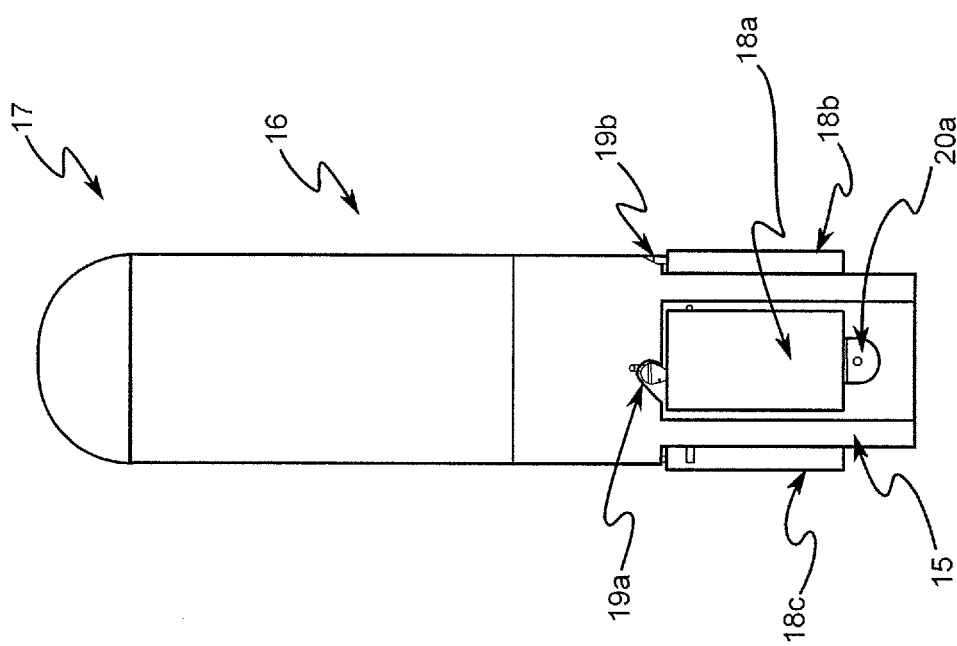

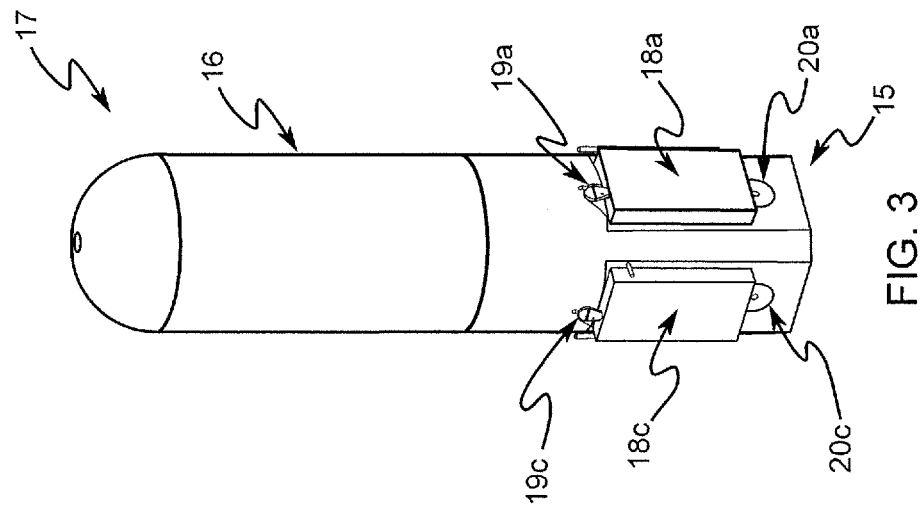
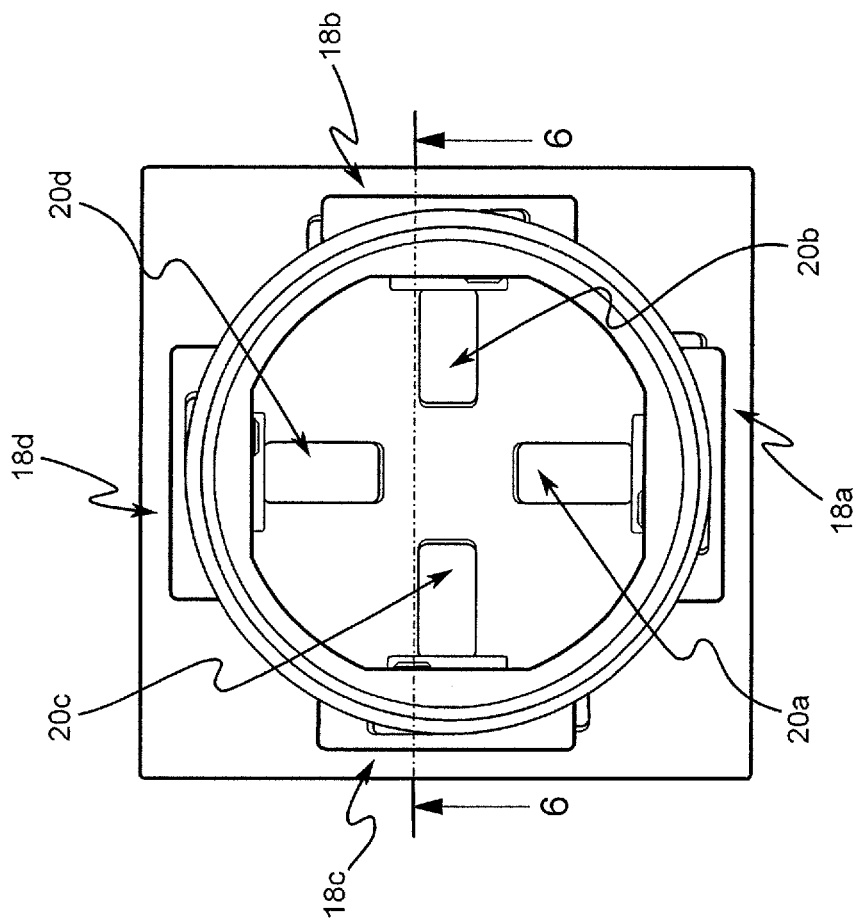

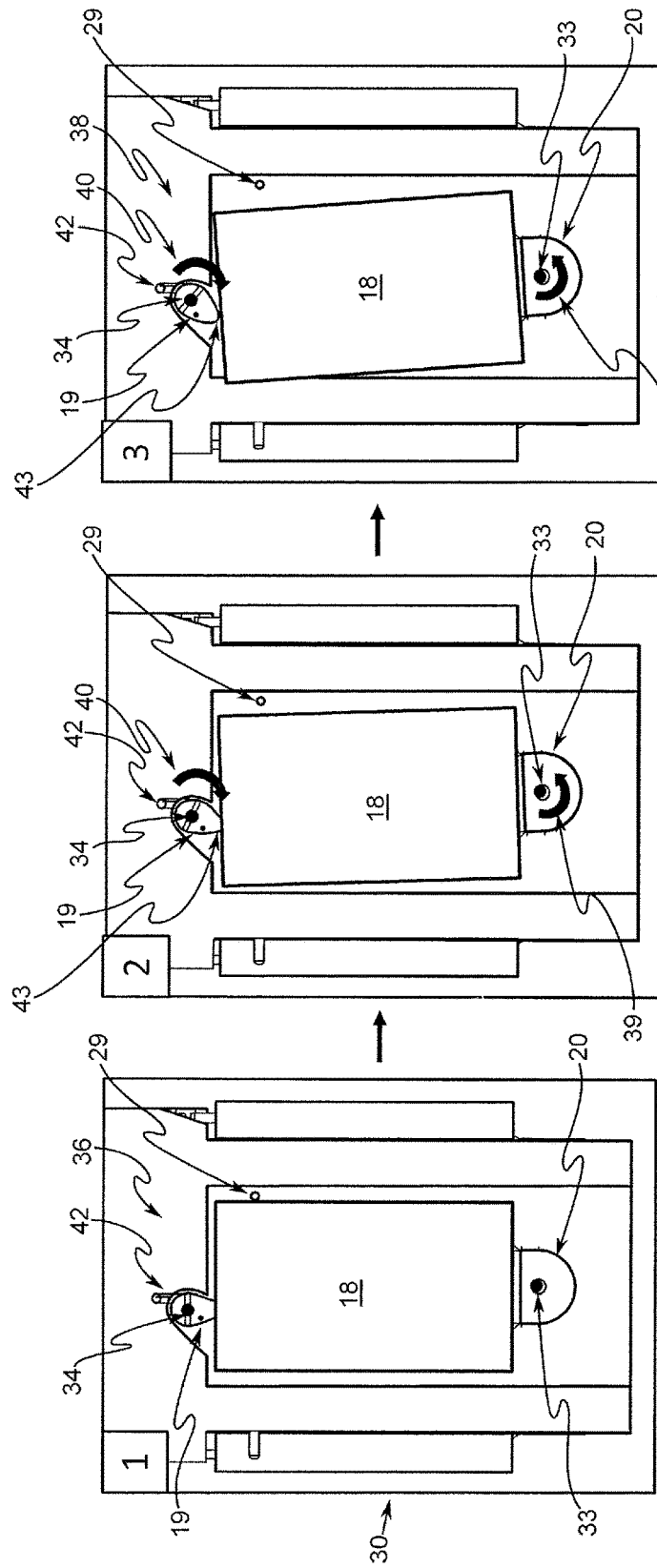

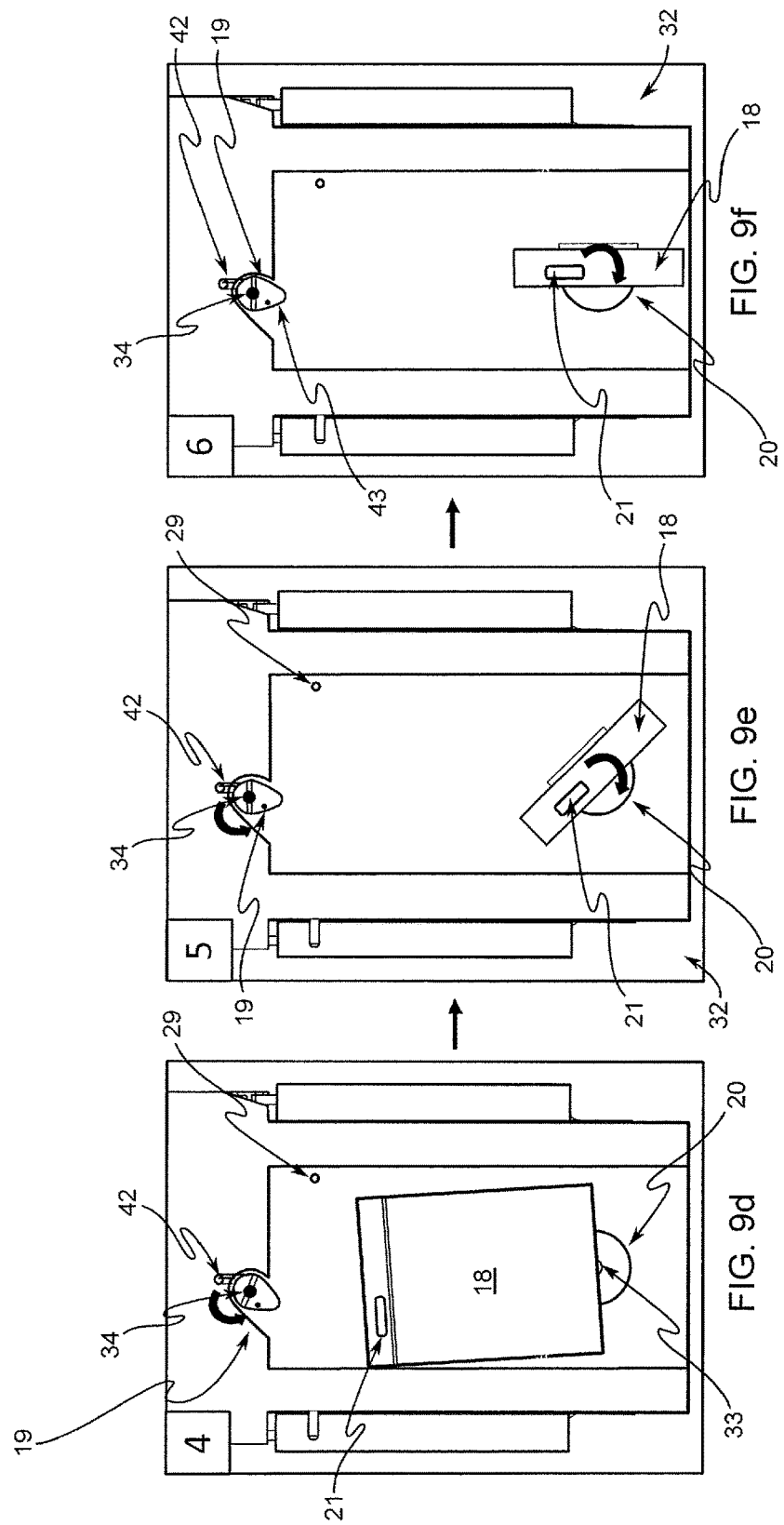

FIN RETENTION AND RELEASE MECHANISM

TECHNICAL FIELD

The present invention relates generally to the field of projectile fin retention devices, and more particularly to an improved fin retention and release mechanism.

BACKGROUND ART

Conventional projectiles, such as missiles, have actuated fins that help steer the projectile towards an intended target. Such projectiles often include a locking mechanism that retains the fins in a stowed position, such as prior to launch or during transportation. After launch, the fins are deployed and thereafter actuated to control the angle of attack of the fins and the control flight of the projectile. A control actuation system adjusts the position of the fins during operation in response to steering commands received from the controller. U.S. Pat. No. 6,726,147, entitled "Multi-Functional Actuator, and Method of Operating Same," the disclosure of which is incorporated herein in its entirety, discloses an actuator system for a projectile fin.

Conventional locking mechanisms for transitioning from a stowed position to a deployed position have included pyrotechnic or explosive release mechanisms, such as an explosive squib, and solenoids and fin lock release motors configured to hold the fins in a retracted or stowed position and to allow them to move into a deployed position by command.

BRIEF SUMMARY OF THE INVENTION

With parenthetical reference to corresponding parts, portions or surfaces of the disclosed embodiment, merely for the purposes of illustration and not by way of limitation, the present invention provides an improved fin retention and release mechanism (15) comprising an elongated body (16), at least one fin (18a) mounted to the body and capable of moving from a stowed position (30) to a deployed position (32), an actuator (20a) connected to the fin and arranged to rotate the fin about a first axis (33), a fin retention member (19a) connected to the body and configured and arranged to rotate about a second axis (34) from a locked position (36) to a release position (38), the fin and the fin retention member configured and arranged such that the fin is held in the stowed position by the fin retention member when the fin retention member is in the locked position and the fin is not held in the stowed position by the fin retention member when the fin retention member is in the release position, and wherein selective actuation of the fin about the first axis by the actuator rotates the fin about the first axis in a first direction (39) and correspondingly rotates the fin retention member about the second axis in a second direct (40) opposite to the first direction and from the locked position to the release position.

The fin may be pivotally mounted to the body and rotatable around a third axis (35) from the stowed position to the deployed position. The fin retention and release mechanism may further comprise a spring element (23) arranged between the fin retention member and the body and configured to bias the fin retention member toward the locked position. The fin retention member may comprise a retaining end portion (24) and a shaft portion (25) and the spring element may comprise a torsion spring orientated about the shaft portion. The fin retention member may comprise a reset groove (26) configured and arranged to receive a reset tool, wherein the fin retention member may be manually rotated from the locked position to the release position. The fin may comprise a retaining pocket (21), the fin retention member may comprise a retaining end portion (24), and the fin retaining pocket may be configured and arranged to receive the end portion of the retention member when the fin is in the stowed position. The fin retention member may comprise a generally cam-shaped retaining end portion (24) and a shaft portion (25). The fin retention member may be connected to the body with a retaining ring (28). The body may comprise a fin stop (29). The first axis and the second axis may be parallel.

The projectile may comprise a second fin (18c) mounted to the body and capable of moving from a stowed position to a deployed position, a second actuator (20c) connected to the second fin and arranged to rotate the second fin about a first axis, a second fin retention member (19c) connected to the body and configured and arranged to rotate about a second axis from a locked position to a release position, the second fin and the second fin retention member configured and arranged such that the second fin is held in the stowed position by the second fin retention member when the second fin retention member is in the locked position and the second fin is not held in the stowed position by the second fin retention member when the second fin retention member is in the release position, and wherein selective actuation of the second fin about the first axis by the second actuator rotates the second fin about the first axis in a first direction and correspondingly rotates the second fin retention member about the second axis in a second direct opposite to the first direction and from the locked position to the release position.

BRIEF DESCRIPTION OF THE DRAWINGS

FIG. 1 is a front plan view of a projectile with an embodiment of an improved fin retention and release mechanism.

FIG. 2a is a top outer perspective view of the projectile shown in FIG. 1.

FIG. 2b is a top interior view of the projectile shown in FIG. 1.

FIG. 3 is a side perspective view of the projectile shown in FIG. 1.

FIGS. 9a-9f are front plan views of the fin retention and release mechanism of FIG. 3 showing a fin deployment sequence.

DETAILED DESCRIPTION OF THE PREFERRED EMBODIMENTS

Figure 5:
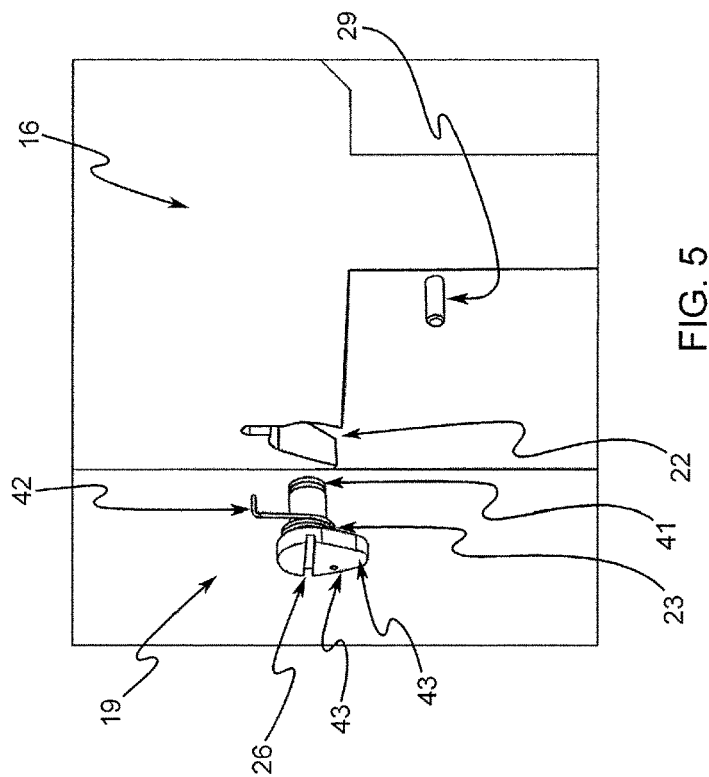
FIG. 5 is a partial exploded and enlarged view of one fin retention and release mechanism shown in FIG. 4.
Figure 4:
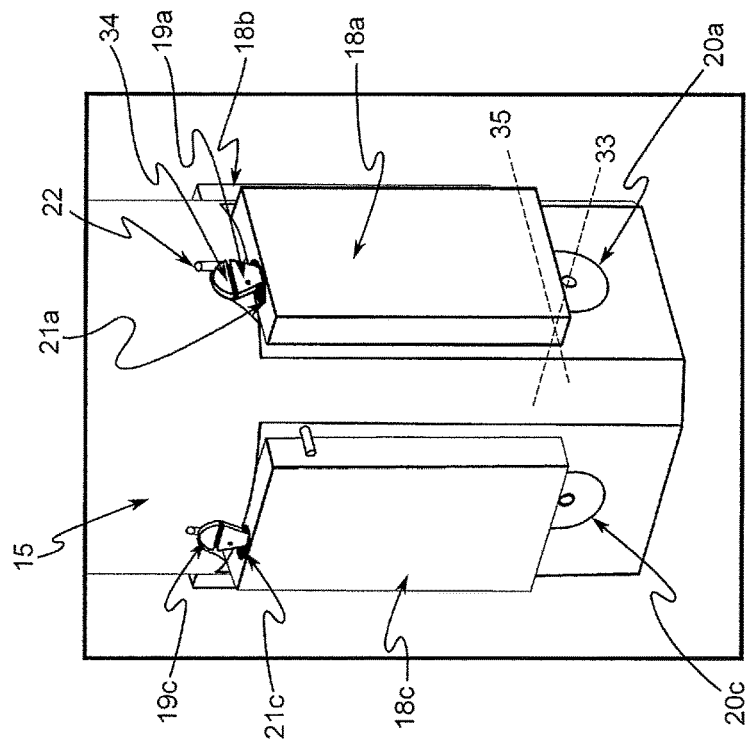
FIG. 4 is an enlarged perspective view of the fin retention and release mechanism shown in FIG. 3.
Figure 7:
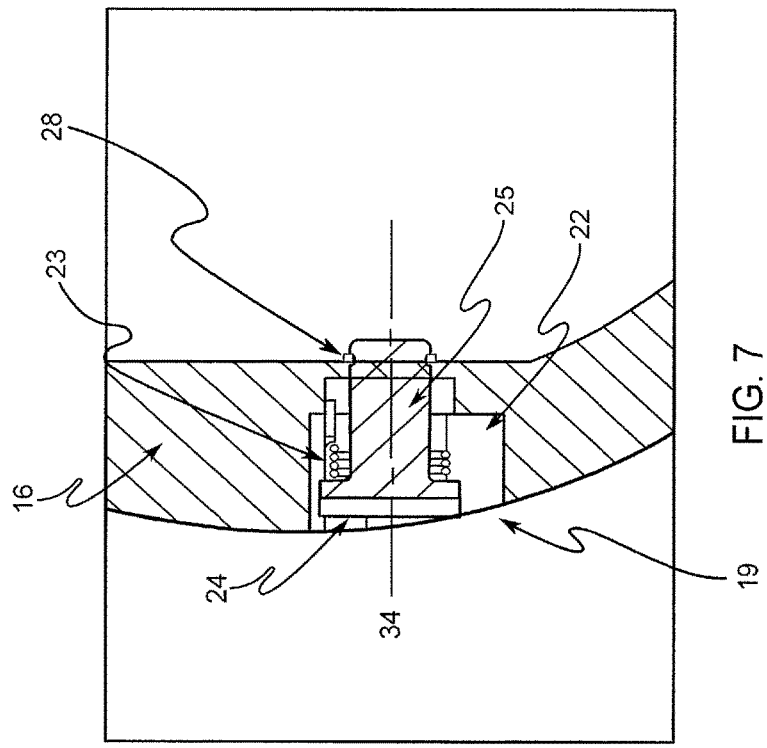
FIG. 7 is a partial horizontal cross-sectional view of the fin retention and release mechanism shown in FIG. 6.
Figure 6:
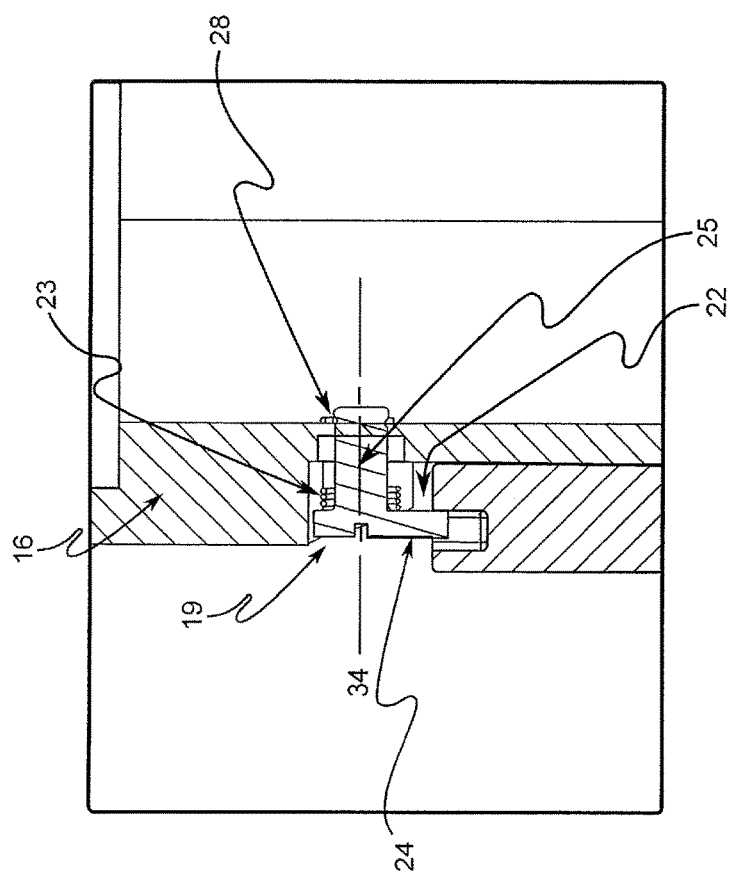
FIG. 6 is a partial vertical cross-sectional view of the fin retention and release mechanism shown in FIG. 2b, taken generally in line 6-6 of FIG. 2b.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIG. 1 thereof, a fin retention and release mechanism is provided, an embodiment of which is generally indicated at 15. As shown in FIG. 1, projectile 17 generally comprises a body 16 and four deployable fins 18a-18d for controlling the flight of the projectile. Prior to deployment, fins 18a-18d are folded up in stowed position 30, a position shown in FIGS. 1-4 and 9a. Anchored to hinge pins at their base, fins 18 pivot or rotate about axis 35 to deployed position 32, shown in FIGS. 9e and 9f, following missile launch. Torsional springs serve to urge fins 18 toward deployed position 32. Fins 18 are retained in stowed position 30, against the biasing force of the torsional springs urging them to pivot outward, by latching mechanism 15

Each of fins 18a-18d is rotatably connected at its base to actuators 20a-20d, respectively. Actuators 20 thereby control rotation of fins 18 about axis 33. Actuators 20 are in electrical communication with a controller, such as a processor, which receives position signals from a flight control center. Based upon signals received by the controller, the controller commands the actuators to adjust the position of fins 18 as desired to steer projectile 17 towards a target or to release fins 18.

Figure 8:
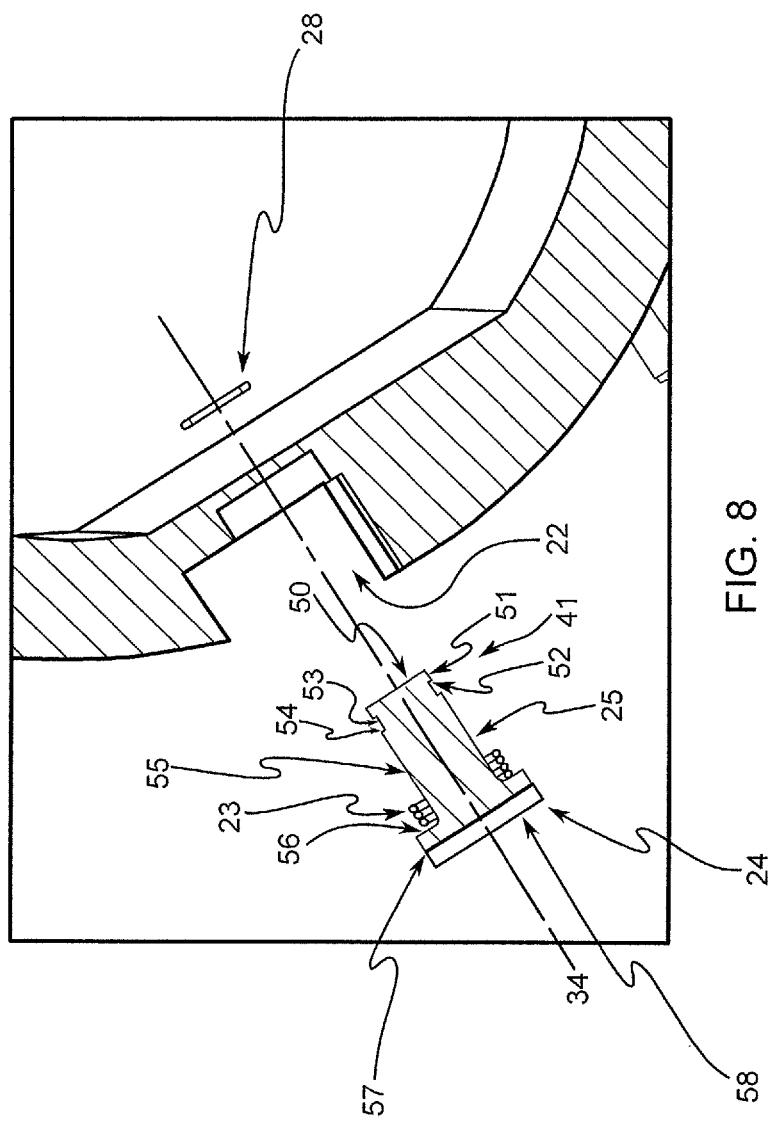
FIG. 8 is an exploded cross-sectional view of the fin retention and release mechanism shown in FIG. 7.
Figure 10:
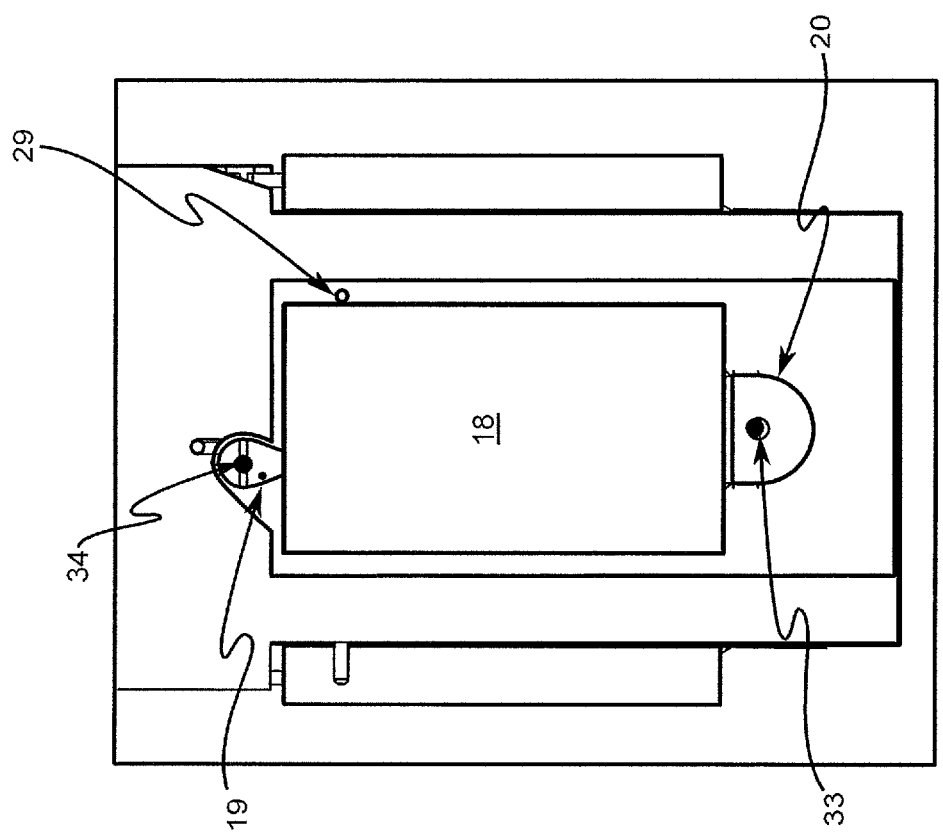
FIG. 10 is an enlarged view of the fin retention and release mechanism shown in FIG. 4.
Figure 11:
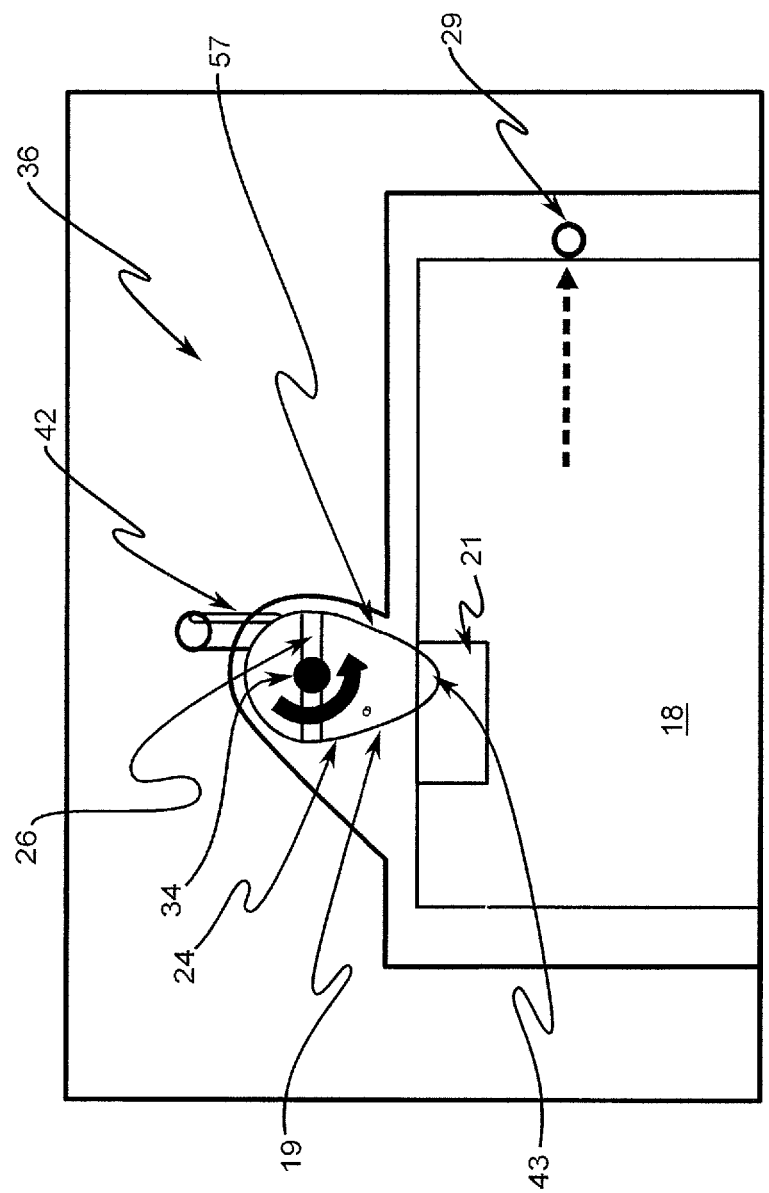
FIG. 11 is a further enlarged partial view of the fin retention and release mechanism shown in FIG. 10.

As shown, fin retention mechanism 15 generally comprises lock-pin 19, torsional spring 23, retaining ring 28, and stop 29. As shown in FIGS. 5-8, lock-pin 19 generally comprises shaft portion 25 and cam-shaped end portion 24 having a minimum outside diameter greater than the outside diameter of shaft 25. As shown in FIG. 8, lock-pin 19 is generally bounded by rightwardly-facing vertical surface 50, outwardly-facing horizontal cylindrical surface 51, leftwardly-facing vertical annular surface 52, outwardly-facing horizontal cylindrical surface 53, rightwardly-facing vertical annular surface 54, outwardly-facing horizontal cylindrical surface 55, rightwardly-facing vertical annular surface 56, outwardly-facing horizontal cam surface 57, and leftwardly-facing vertical surface 58.

As shown, surfaces 52, 53 and 54 define shaft retention groove 41, which is configured to engage retaining ring 28 fixed to body 19 such that lock-pin 19 is permitted to rotate about axis 34 but is secured from movement longitudinally or axially along axis 34. Thus, lock-pin 19 is rotatably connected to body 19 such that end portion 24 can rotate at least partially about axis 34.

As shown, a specially configured pin recess 22 is formed in body 16 to receive shaft 25. Recess 22 provides a housing to support rotating lock-pin 19 and anti-rotate torsion spring 23. The inner portion of recess 22 is generally cylindrical and includes retaining ring 28 near the base of the cylindrical recess so as to receive shaft 25 in rotational engagement. Recess 22 is also includes a slot for receiving spring end 42.

Spring end 42 bears against the walls of recess 22. The end of spring 23 on the other side of the coil from end 42 is captured in a hole in surface 56 of end portion 24 of pin-lock 19. Thus, torsional spring 23 is installed on shaft 25 of lock-pin 19 such that it is anti-rotated in recess 22 and preloads lock-pin 19 against pocket 21 in the top end of fin 18. Lock-pin 19 is biased toward locked position 36 and, absent a countering force, will move to locked position 36. One side of surface 57 of end portion 24 bears against one side of pocket 21 in fin 18 such that fin 18 is loaded against stationary dowel pin 29 as a result of the torsional load of spring 23 on lock pin 19. With shaft 25 axially secured to body 16 by retaining ring 28 in shaft retention groove 41, part of surface 56 of end portion 24 of pin 19 bears against the outside surface of fin 18 to hold it in stowed position 30.

As shown in FIGS. 9a-9f, lock-pin 19 is configured to rotate about axis 34 from locked position 36, in which tip 43 of end portion 24 engages pocket 21 in fin 18, to release position 38, in which tip 43 of end portion 24 of lock-pin 19 does not extend into pocket 21 of fin 18. Thus, in a released position, lock-pin 19 does not restrain fin 18 from rotating about axis 35 from stowed position 30 to deployed position 32.

As shown in FIGS. 9a-9f, to release fin 18, actuator 20 is programmed to rotate about fin axis 33 in counter-clockwise direction 39 relative to body 19 a set distance. The rotational force of actuator 20 is enough to overcome the countering spring force of spring 23 in the clockwise direction about pin axis 34. Thus, the edge of pocket 21 bears against the side surface 57 of end portion 24 of pin 19, causing pin 19 to rotate in clockwise direction 40 about pin axis 34. As this rotation continues, as shown in FIG. 9c, tip 43 of end portion 24 of pin 19 clears pocket 21 in fin 18, thereby releasing fin 18 such that fin 18 can rotate about axis 35 from stowed position 30, shown in FIGS. 9a-9c, to deployed position 32, shown in FIGS. 9e and 9f. This deployment from stowed position 30 to deployed position 32 is shown in FIG. 9d. Once in deployed position 32, as shown in FIGS. 9e and 9f, fin 18 can be rotated back clockwise and actuated to the desired position about fin axis 33. Thus, actuator 20 controls both the operational rotation of fins 18 as well as the rotation of lock-pin 19 from locked position 36 to release position 38 to release fin 18 for deployment. No separate motor, actuator, solenoid or pyrotechnic release mechanism is required. Thus, mechanism 15 employs passive mechanical retention, coupled with control surface actuator motion, to stow and then release fin 18.

Release mechanism 15 is also resectable. Once fin 18 moves out of stowed position 30, spring 23 returns lock-pin 19 to the null or stowed position 30, which prevents rattling in assembly. As shown, lock-pin 19 includes outer slot 26, which is configured to receive the end of a flat-headed screwdriver, for example. By manually rotating lock-pin 19 using a torquing device, lock-pin 19 may be moved to release position 38 and out of the way of fin 18 such that fin 18 can be placed back in stowed position 30, and then re-locked in the stowed position by releasing lock-pin 19 and allowing tip 43 of end portion 24 of lock-pin 19 to engage pocket 21 in fin 18. For resetting purposes, actuator 20 is of a back-drivable design that employs position feedback if it is to be manually reset. Alternatively, it can be reset using position commands to drive the fin back to the null or stowed-angle position about axis 33. Actuator 20 may then be commanded to the given output position to release fin 18 from release mechanism 15.

As shown, release mechanism 15 as described above may be used to retain and release each of the fins 18a-18d on projectile 17 from a stowed position to a deployed position.

Some designs may require more of a retention margin. Lock-pin mechanism 15 may be sized to keep fin 18 stowed with adequate margin when the assembly is subjected to external environment loads, including random vibration and shock events. A number of design alternatives may be used for altering the retention torque holding fin 18 in place.

First, a torsion spring may be selected that allows for adequate preload force development, and sufficient travel for release of fin 18. Depending on the amount of preload desired, and where the anti-rotating features of recess 22 in the housing are located, a torsion spring of 90-360 degrees can be used. Changing to a larger degree torsion spring allows for more preload in the same package, but also requires more driving torque from actuator 20 to release fin 18. A larger or smaller wire torsion spring may be used to alter preload force with minimal impact on design and a larger or smaller outside diameter torsion spring and mating lock-pin shaft 25 may also be used to vary the force margin.

Figure 12:
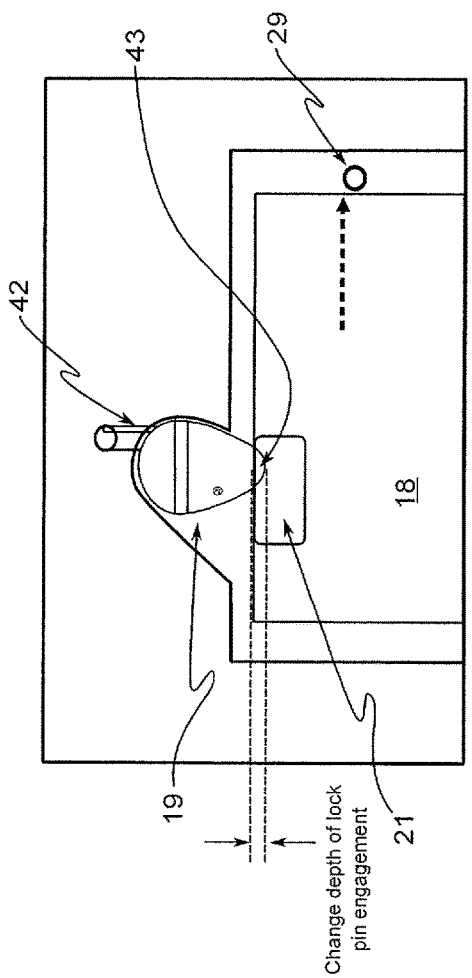
FIGS. 12 and 13 are views of the fin retention and release mechanism shown in FIG. 11 with alternate engagement depths.
Figure 13:
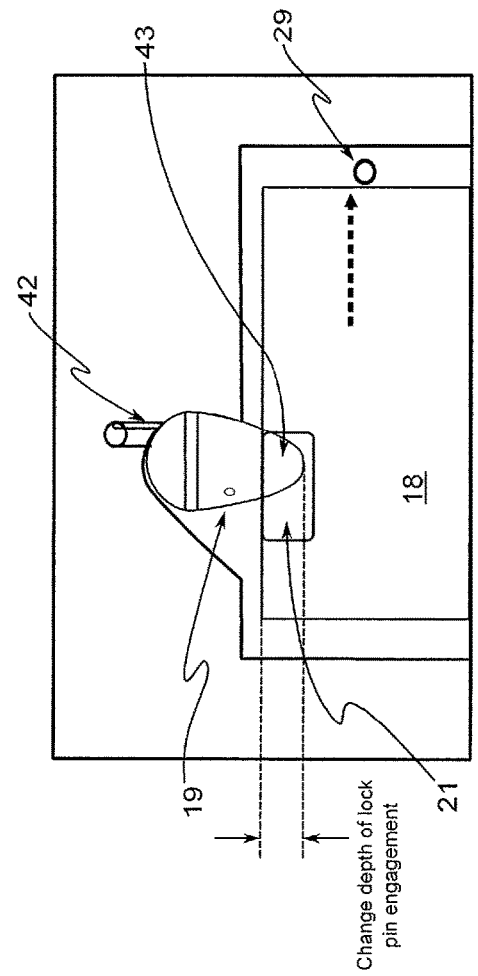
Figure 15:
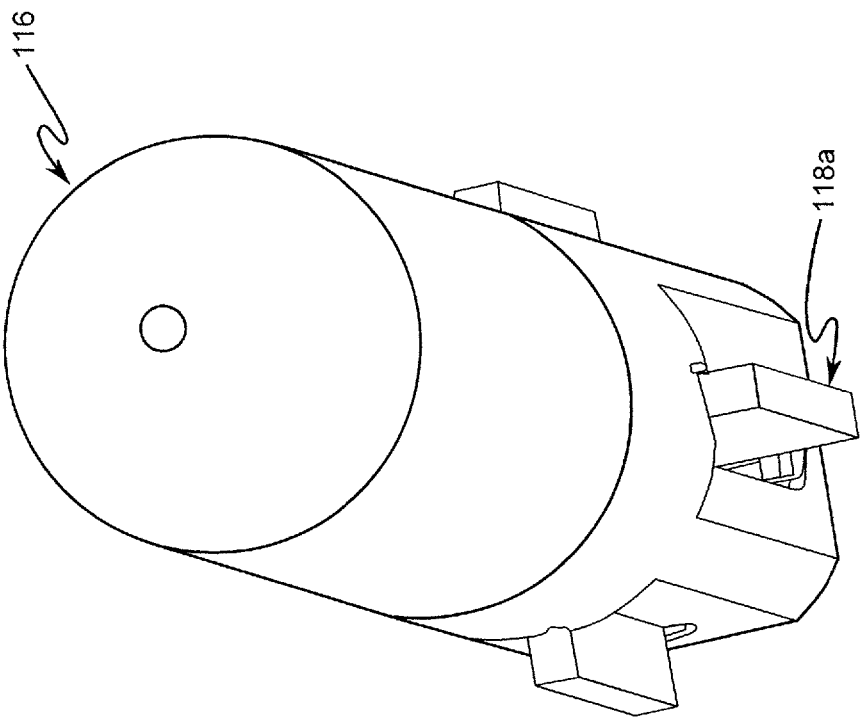
FIG. 15 is a top perspective view of the projectile shown in FIG. 14.
Figure 14:
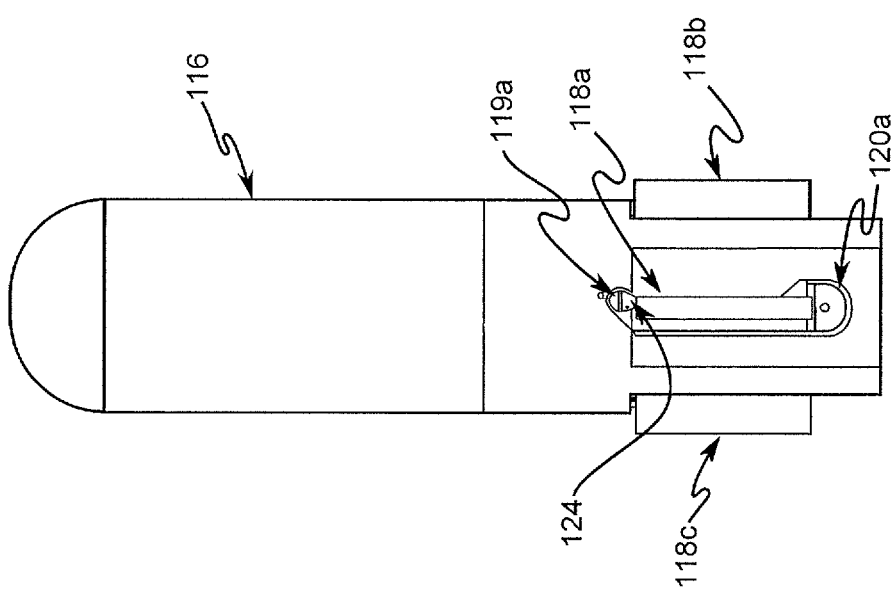
FIG. 14 is a front plan view of a projectile having switch-blade style fins.

Second, the depth of tip 43 of end portion 24 of lock-pin 19 in pocket 21 of fin 18 may be varied, as shown in FIGS. 12 and 13. By changing the depth of the engagement of end portion 24 of lock-pin 19 in pocket 21 of fin 18, the amount of actuator 20 rotation required to release fin 18 can be modified and more or less margin can be added to retention of fin 18.

Third, the geometry of end portion 24 and "cam" surfaces 57, 58 of pin 19 may be varied together with pocket or slot interface 21. Modifications to the interface geometry between lock-pin 19 and fin 18 can be performed to fine tune the load properties of retention mechanism 15. For example, the applicable ramp angle of outer surface 57 of end portion 24 of lock-pin 19 may be varied, as can the length of the locking section of pin 19 and the tip design of end portion 24 of pin 19.

Fourth, depending on the type and orientation of the mechanism/spring for deploying fin 18 about axis 35, lock-pin 19 may be moved to a different location on the fin to alter the effective moment arm and retention load on the fin. An example of this would be to lower the lock-pin location relative to the stowed fin so that it is closer to the base of fin 18. This may be desired if the actuator has limited travel to release fin 18.

Figure 16C:
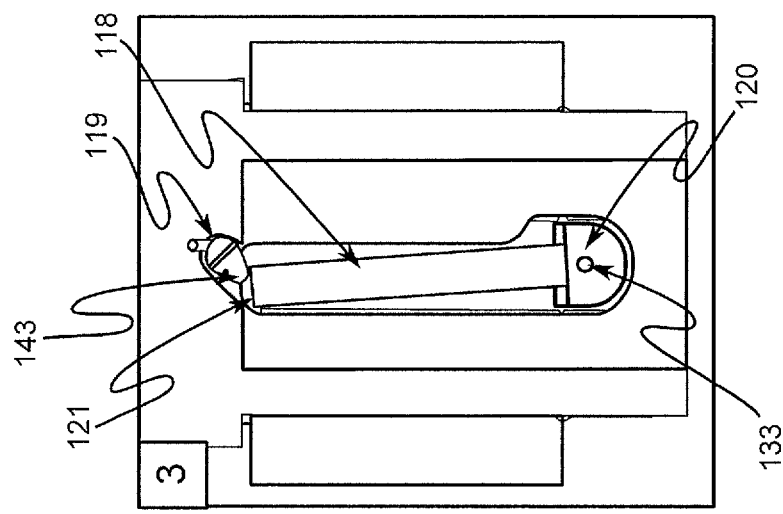
FIGS. 16a-16c are front plan views of the fin retention and release mechanism of FIG. 14 showing a fin deployment sequence.
Figure 16B:
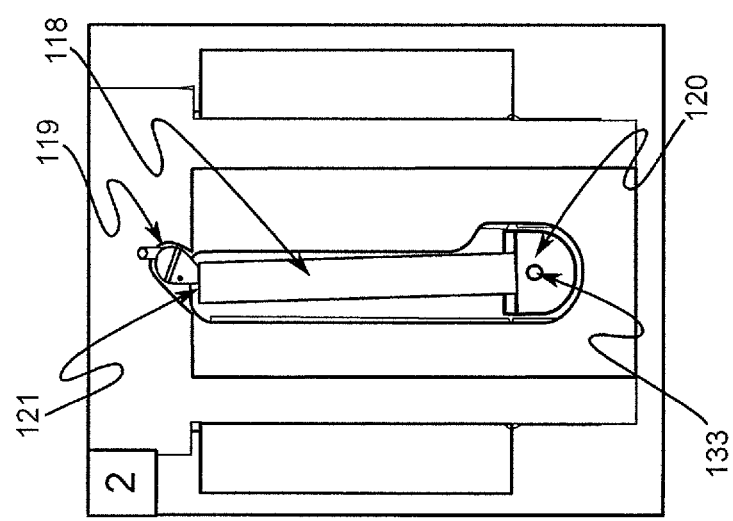
Figure 16A:
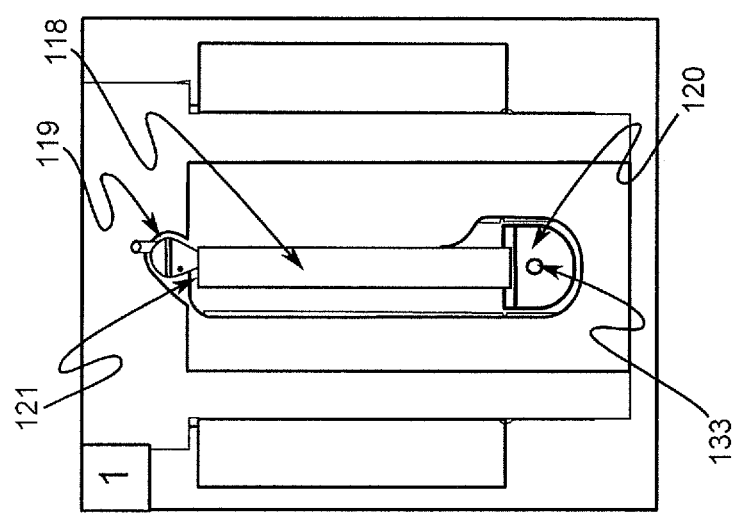

FIGS. 14, 15 and 16a-16c shown an alternative embodiment in which retention mechanism 15 is employed on a projectile having switch-blade release style fins. As shown in FIGS. 16a-16c, the pocket in the end of the fin is orientated perpendicular to the orientation of pocket 21 in flap-style release fins 18. As with flap-style release fins 18 in the embodiment shown in FIGS. 1-13, actuation of switch-blade style fins 118 about axis 133 in a counter-clockwise direction causes rotation of pin 119 in a clockwise direction until tip 143 of end portion 124 of pin 119 clears pocket 121 in fin 118, thereby releasing fin 118 from its stowed position and allowing it to move into a deployed position.

The present invention contemplates that many changes and modifications may be made. Therefore, while an embodiment of the improved fin retention and release mechanism has been shown and described, and a number of alternatives discussed, persons skilled in this art will readily appreciate that various additional changes and modifications may be made without departing from the spirit of the invention, as defined and differentiated by the following claims.

What is claimed is:

1. A projectile comprising:
an elongated body;
at least one fin mounted to said body and capable of moving from a stowed position to a deployed position;
an actuator connected to said fin and configured to selectively rotate said fin about a first axis in both a first direction and a second direction to operatively adjust a position of said fin about said first axis;
a fin retention member connected to said body and configured to rotate about a second axis from a locked position to a release position;
said fin and said fin retention member configured such that said fin is held in said stowed position by said fin retention member when said fin retention member is in said locked position and said fin is not held in said stowed position by said fin retention member when said fin retention member is in said release position; and
wherein selective actuation of said fin about said first axis by said actuator rotates said fin about said first axis in said first direction and correspondingly rotates said fin retention member about said second axis in a second direction opposite to said first direction and from said locked position to said release position.

2. The projectile set forth in claim 1, wherein said fin is pivotably mounted to said body and rotatable about a third axis from said stowed position to said deployed position.

3. The projectile set forth in claim 1, and further comprising a spring element arranged between said fin retention member and said body and configured to bias said fin retention member toward said locked position.

4. The projectile set forth in claim 3, wherein said fin retention member comprises a retaining end portion and a shaft portion and said spring element comprises a torsion spring orientated about said shaft portion.

5. The projectile set forth in claim 3, wherein said fin retention member comprises a reset groove configured to receive a reset tool, wherein said fin retention member may be manually rotated from said locked position to said release position.

6. The projectile set forth in claim 1, wherein said fin comprises a retaining pocket, said fin retention member comprises a retaining end portion, and said fin retaining pocket is configured to receive said end portion of said retention member when said fin is in said stowed position.

7. The projectile set forth in claim 1, wherein said fin retention member comprises a substantially tear shaped retaining end portion and a shaft portion.

8. The projectile set forth in claim 1, wherein said fin retention member is connected to said body with a retaining ring.

9. The projectile set forth in claim 1, wherein said body comprises a fin stop.

10. The projectile set forth in claim 1, wherein said first axis and said second axis are parallel.

11. The projectile set forth in claim 1, and further comprising a second fin mounted to said body and capable of moving from a stowed position to a deployed position, a second actuator connected to said second fin and configured to selectively rotate said second fin about a second fin axis in both a first direction and a second direction to operatively adjust a position of said second fin about said second fin axis, a second fin retention member connected to said body and configured to rotate about a second fin retention member axis from a locked position to a release position, said second fin and said second fin retention member configured such that said second fin is held in said stowed position by said second fin retention member when said second fin retention member is in said locked position and said second fin is not held in said stowed position by said second fin retention member when said second fin retention member is in said release position, and wherein selective actuation of said second fin about said second fin axis by said second actuator rotates said second fin about said second fin axis in a first direction and correspondingly rotates said second fin retention member about said second fin retention member axis in a second direction opposite to said first direction and from said locked position to said release position.

* * * * *